United States Patent [19]

Alles et al.

[11] 3,723,652

[45] Mar. 27, 1973

[54] ELECTRICAL CIRCUIT FOR ENABLING THE VISUAL DISPLAY OF AN AUDIO SIGNAL BY A CONVENTIONAL TELEVISION RECEIVER

[76] Inventors: Harold G. Alles, 1860 Riverview St.; John C. Nosler, 2587 Floral Hill Dr., both of Eugene, Oreg. 97403

[22] Filed: Oct. 12, 1970

[21] Appl. No.: 79,804

[52] U.S. Cl. .................179/1 VS, 178/5.2 R, 84/464

[51] Int. Cl. ...........................H04n 9/00, A53j 17/00

[58] Field of Search........179/1 VS; 324/77 R, 77 A, 324/77 B, 77 C; 84/464; 178/5.6, 5.4, 5.2, 5.4 TE

[56] References Cited

UNITED STATES PATENTS

| | | | |
|---|---|---|---|
| 2,671,130 | 3/1954 | Weighton et al. | 178/5.6 |
| 2,804,500 | 8/1957 | Giacoletto | 179/1 VS |
| 3,581,192 | 5/1971 | Miura | 324/77 |

OTHER PUBLICATIONS

General Electric, Color TV, 1957, page 57.

*Primary Examiner*—Benedict V. Safourek
*Assistant Examiner*—John C. Martin
*Attorney*—Kimmel, Crowell & Weaver

[57] ABSTRACT

An audio-video interface network for transforming audio signals from an audio source into a form suitable for reception and visual display by an unaltered black-and-white or color television receiver whereby multifarious kaleidoscopic visual interpretations of the audio input signals may be entertainingly displayed upon the face of the television receiver. The interface network includes an audio signal separator for separating the audio input signals into a plurality of different frequency bands, an internal pattern generator responsive to the separated audio signals for generating a plurality of electrical signals each uniquely representative of the content of the audio input signals, and a video signal generator responsive to the separated audio input signals and the plurality of electrical signals for generating a modulated radio frequency television signal representative of the separated audio input signals as well as the internally generated electrical signals.

35 Claims, 6 Drawing Figures

INVENTORS
HAROLD G. ALLES
JOHN C. NOSLER
BY Kimmel, Crowell & Weaver
ATTORNEYS

INVENTORS

HAROLD G. ALLES
JOHN C. NOSLER

BY Kimmel Crowell & Weaver
ATTORNEYS

INVENTORS
HAROLD G. ALLES
JOHN C. NOSLER

BY Kimmel, Crowell & Weaver
ATTORNEYS

INVENTORS
HAROLD G. ALLES
JOHN C. NOSLER
BY Kimmel Crowell & Weaver
ATTORNEYS

ELECTRICAL CIRCUIT FOR ENABLING THE VISUAL DISPLAY OF AN AUDIO SIGNAL BY A CONVENTIONAL TELEVISION RECEIVER

BACKGROUND OF THE INVENTION

1. Field of the Invention

The present invention pertains generally to electrical systems providing visually perceptible interpretations of sound, and more particularly, to an electrical interface network for transforming audio signals into a form suitable for reception by an unaltered television receiver thereby enabling the production of constantly varying, entertaining visual patterns representative of such audio signals.

2. Description of the Prior Art

Various systems have been developed in the past for providing interesting and continuously varying patterns of colors by the use of differently colored lights. Such systems are often electronically controlled in response to amplitude and/or frequency variations in musical sounds whereupon a myriad of entertainingly artistic, random compositions of the various color shades and tones are produced in a visually perceptible portrayal of the music.

A number of approaches in the design of a simple and inexpensive system for intimately correlating the musical content of an electrical audio signal with a geometric or a random pattern of colored light have been previously proposed, most of which include electrical circuitry having a plurality of audio frequency filters selectively interconnected with a plurality of banks of differently colored lights. One typical system, for example, operates upon the audio signals generated by a phonograph, tape recorder, or the like, to separate the signals by means of frequency selective filter networks into distinct frequency bands. A different bank of colored lights is associated with each of the frequency selective filters such that various color patterns will be combined to produce an overall visual effect representative of the tonal content of the music input. In other words, those music input signals containing predominantly low frequency components might produce a predominantly red pattern, for example, while the high frequency components of such signals might produce a predominantly yellow pattern. A further refinement of the above mentioned system utilizes stationary or revolving shadow masks or translucent patterned screens placed between the area to be illuminated and the colored light banks to increase the variety of the generated display patterns.

While the above systems have been conventionally employed in large theaters, arenas, etc. to produce visually enhancing stage effects in conjunction with such activities as music concerts, and the like, the kaleidoscopic light patterns and visual effects provided by these systems have created a demand for similar small units for use in private homes. U.S. Pat. No. 2,804,500, for example, discloses a color interpretation system in which electrical music signals are processed and then fed via separate paths to the control electrodes of a single tri-color picture tube in a television receiver. As described and illustrated in the patent, a television receiver incorporating such a system must be quite extensively modified before the various color interpretations can be viewed. This has the obvious disadvantage of discouraging many people from purchasing such systems and enjoying the entertaining displays which can be produced, since considerable expense is involved in modifying the circuitry of a standard color television receiver so as to enable generation of the color display. Such extensive modifications to as complex a device as a home color television receiver also disadvantageously increase the possibility of more frequent servicing and often render what would otherwise be routine maintenance practically impossible.

While the prior art, as exemplified by U.S. Pat. No. 2,804,500, is generally cognizant of television systems which are capable of converting music signals into multifarious colored patterns, a reliable and inexpensive circuit for uniting an audio source, such as a phonograph, with a television receiver without necessitating any alteration or modification of either the audio source or the television receiver has heretofore been unavailable. As a direct result, the many advantages provided by systems of this type have not yet been fully realized.

SUMMARY OF THE INVENTION

It is accordingly an object of the present invention to transform audio signals into a form suitable for reception and video display by a standard unaltered television receiver.

Another object of this invention is to combine a plurality of internally generated signals with a plurality of frequency separated audio input signals to enable production of a highly kaleidoscopic visual display by a conventional television receiver.

The present invention has another object in the generation of a plurality of unique aperiodic electrical signals representative of the tonal content of an audio input signal.

A further object of the present invention is the construction of a simple logic circuit for generating a plurality of mutually exclusive phase-shifted asymmetric square waves capable of enabling the display of specific color combinations and patterns by a television receiver.

A still further object of this invention is to interpret and translate music signals for video display by an unaltered television receiver.

The present invention has another object in that audio signals are processed, translated and broadcast at radio frequencies for reception by a proximately located conventional television receiver.

Yet another object of this invention is to construct an audio-video interface network utilizing relatively few components and being economical in manufacture.

The present invention is summarized in that an audio-video interface network for transforming audio signals from an audio source into a form suitable for reception and visual display by an unaltered standard television receiver includes an audio separator for separating the audio input signals into a plurality of different frequency bands, an internal pattern generator responsive to the separated audio signals for generating a plurality of electrical signals each uniquely representative of the content of the audio input signals, and a video signal generator responsive to the separated audio input signals and the plurality of electrical signals for generating a modulated radio frequency television signal representative thereof whereby the television receiver displays a continually changing visually perceptible interpretation of the applied audio signals.

The present invention is advantageous over prior art audio portrayal systems in the construction of a simple, inexpensive electrical circuit which is readily adaptable to solid-state manufacture and which enables the generation of a multifarious video display of an audio input signal by a standard unaltered television receiver.

Further objects and advantages of the present invention will become apparent from the following description of the preferred embodiment when taken in conjunction with the accompanying drawings.

DESCRIPTION OF THE PREFERRED EMBODIMENT

Figure 1:
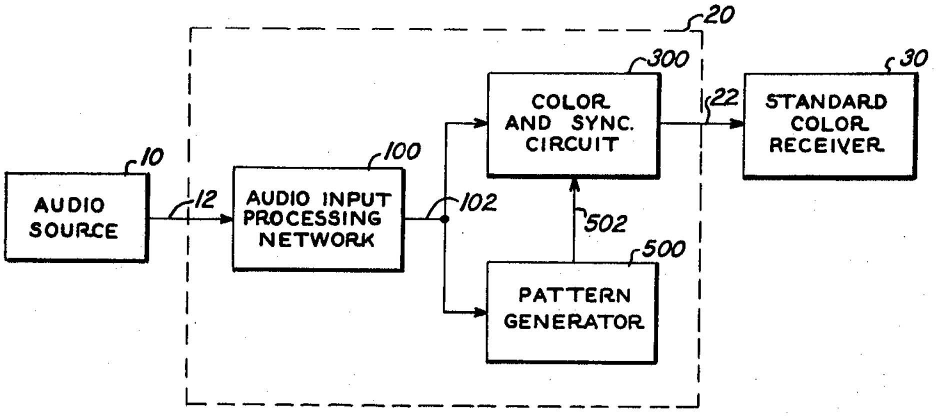
FIG. 1 is a block diagram of a television system embodying an audio-video interface network according to the present invention.

The present invention is embodied in a television system, illustrated in FIG. 1, wherein audio signals are produced by a low impedance audio source 10, which may be of any suitable type such as a phonograph, a tape recorder, a microphone, a radio tuner, or the like. Of course, since audio source 10 is preferably a low impedance source, a suitable amplifier may be necessary when using certain input devices such as a microphone, a radio tuner, or the like. The output from audio source 10 is applied via line 12 to the input of the audio-video interface network of the present invention, indicated generally at 20. The output of the interface network 20 is fed by a line 22 to the antenna input of a standard television receiver 30 which may be of any suitable type and is preferably a color television set. It should be noted, that the present invention is capable of generating signals which are suitable for reception by both black-and-white and color television receivers; however, the myriad of colored patterns provided by a color television receiver makes its use highly preferred and provides a much more interesting and entertaining display.

It is important to note at this point that the output signals of the interface network 20 are in the form of radio frequency signals, preferably at the frequency of a locally unused television channel, and have a sufficiently large amplitude to generate enough stray radiation that line 22 need not be directly coupled to the television antenna terminals. In the preferred embodiment, output line 22 need only be placed near the antenna input of receiver 30; as a result no installation is necessary and the television antenna lead wires need not be disturbed.

The audio-video interface network 20 includes an audio processing or separator circuit 100 which is adapted to be connected with audio source 10 via line 12 for processing the desired audio input signals to be displayed. The audio separator circuit 100 contains an attenuator network as well as low and high frequency filtering networks for splitting the audio input signals into a plurality of frequency correlated groups each containing a portion of the original audio information produced by audio source 10. The frequency separated signals from audio separator circuit 100 are coupled through a branched line 102 to a color and sync circuit 300 and a pattern generator circuit 500.

The color and sync circuit 300 generates a modulated radio frequency color television signal having subcarrier components which are representative of each of the three primary additive colors, namely red, blue and green. The color modulation information carried by such signal is correlated through control circuitry to be described below with the processed signals from audio separator circuit 100 such that the pictorial patterns displayed by the television receiver 30 are uniquely interpretative of the tonal content of the signals from audio source 10.

To further enhance the entertainingly kaleidoscopic nature of the resultant audio portrayal at the television receiver 30, the internal pattern generator 500 is designed to produce a plurality of distinct aperiodic electrical signals having wave shapes which are also uniquely representative of the processed audio input signals from the audio separator circuit 100. The resultant electrical signals from pattern generator 500 are coupled via line 502 to the color and sync circuit 300 so as to augment the modulation of the radio frequency signals fed to the television receiver whereupon a considerably greater variety of color patterns will be developed in response to the audio input.

Figure 2:
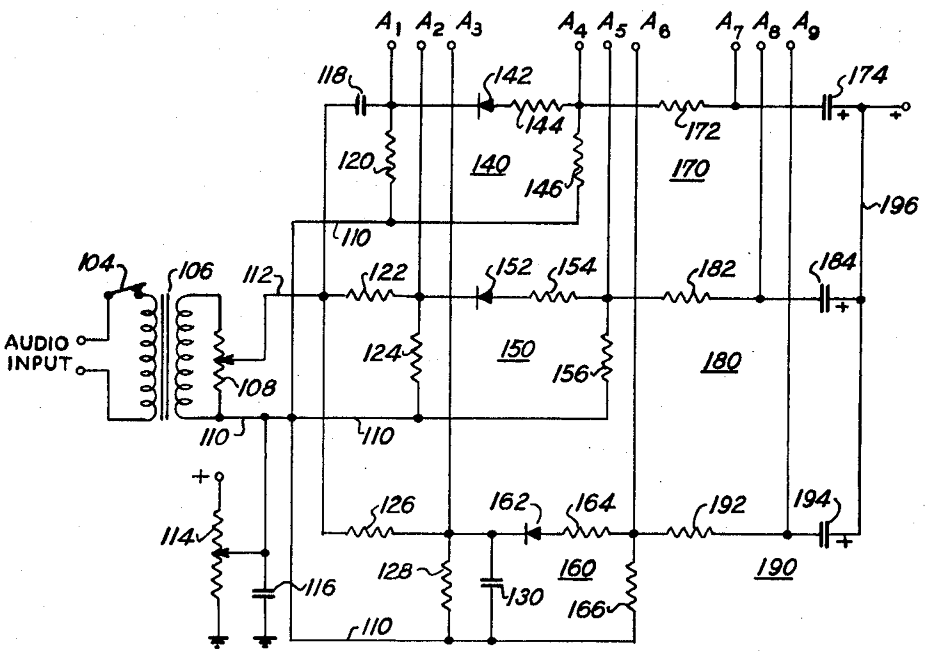
FIG. 2 is a schematic diagram of the audio processing network of the interface network of FIG. 1.

Referring now to FIG. 2, which is a schematic diagram of the audio separator circuit 100, audio input signals from audio source 10 (FIG. 1) are coupled through a normally-closed switch 104 to the primary of an impedance matching transformer 106. The impedance matching transformer is designed to match the relatively low impedance of the output of audio source 10 to the relatively high impedance of the filtering circuits of the audio separator 100. The secondary winding of transformer 106 is connected across a potentiometer 108 which has its lower terminal connected to a common reference bus 110 and its wiper arm connected to a common signal bus 112. By adjusting the potentiometer 108, the level of the audio signals on the common signal bus 112 may be readily selected. The reference level of the common reference bus 110 is similarly adjustable by a potentiometer 114 which is connected across a source of D.C. operating potential and has its wiper arm connected directly to reference bus 110 as well as being coupled to ground through a capacitor 116.

Signal bus 112 is connected to a high pass filter formed by a capacitor 118 and a resistor 120 which are connected in series between bus 112 and reference bus 110; output signals from the high pass filter are taken from the junction of capacitor 118 and resistor 120 which is coupled to a first output terminal $A_1$ as illustrated. The signal bus 112 is also connected to a voltage divider or attenuator network formed by the series connection of a pair of resistors 122 and 124 between bus 112 and reference line 110; attenuated signals are taken from the junction of the two resistors and fed to a second output terminal $A_2$.

A low pass filter is formed by a resistor 126 coupled in series with a parallel network including another resistor 128 and a capacitor 130. In a manner similar to that described above, the low pass filter is connected between signal bus 112 and common reference bus 110, with the output of the filter taken from the junction of resistor 126 and the resistor-capacitor network 128–130 and coupled to a third output terminal $A_3$.

The output signals at terminals $A_1$, $A_2$ and $A_3$ are fed to identical rectifying networks 140, 150 and 160, each including a diode 142-152-162 having its cathode electrode connected to a respective one of terminals $A_1$, $A_2$ and $A_3$ and its anode electrode connected to a series circuit formed by a first resistor 144-154-164 and a second resistor 146-156-166, with the second resistor connected at its other end to reference bus 110. The rectified output signals from networks 140, 150 and 160 are taken from the junction of the first and second resistors and are coupled to third, fourth and fifth output terminals $A_4$, $A_5$ and $A_6$, respectively, as well as to a respective one of identical filtering or smoothing circuits 170, 180 and 190. Each of the filtering circuits 170, 180 and 190 include a resistor 172-182-192 and a capacitor 174-184-194 connected in series between terminal $A_4$-$A_5$-$A_6$ and a power bus 196 which is coupled with a source of positive DC operating potential, as shown. The filtered signals from filtering circuits 170, 180 and 190 are taken from the junctions of the resistor and the capacitor and are fed to output terminals $A_7$, $A_8$ and $A_9$, respectively.

The filtered, rectified and smoothed audio output signals appearing at terminals $A_1$ through $A_9$ are adapted to be connected with the color and sync circuit 300 as well as the pattern generator 500, as will be more fully described below, for generating a plurality of unique modulating signals which, when converted to radio frequencies will enable the generation of a great variety of unusual pictorial representations of the original audio input signals by a standard television receiver.

Figure 3:
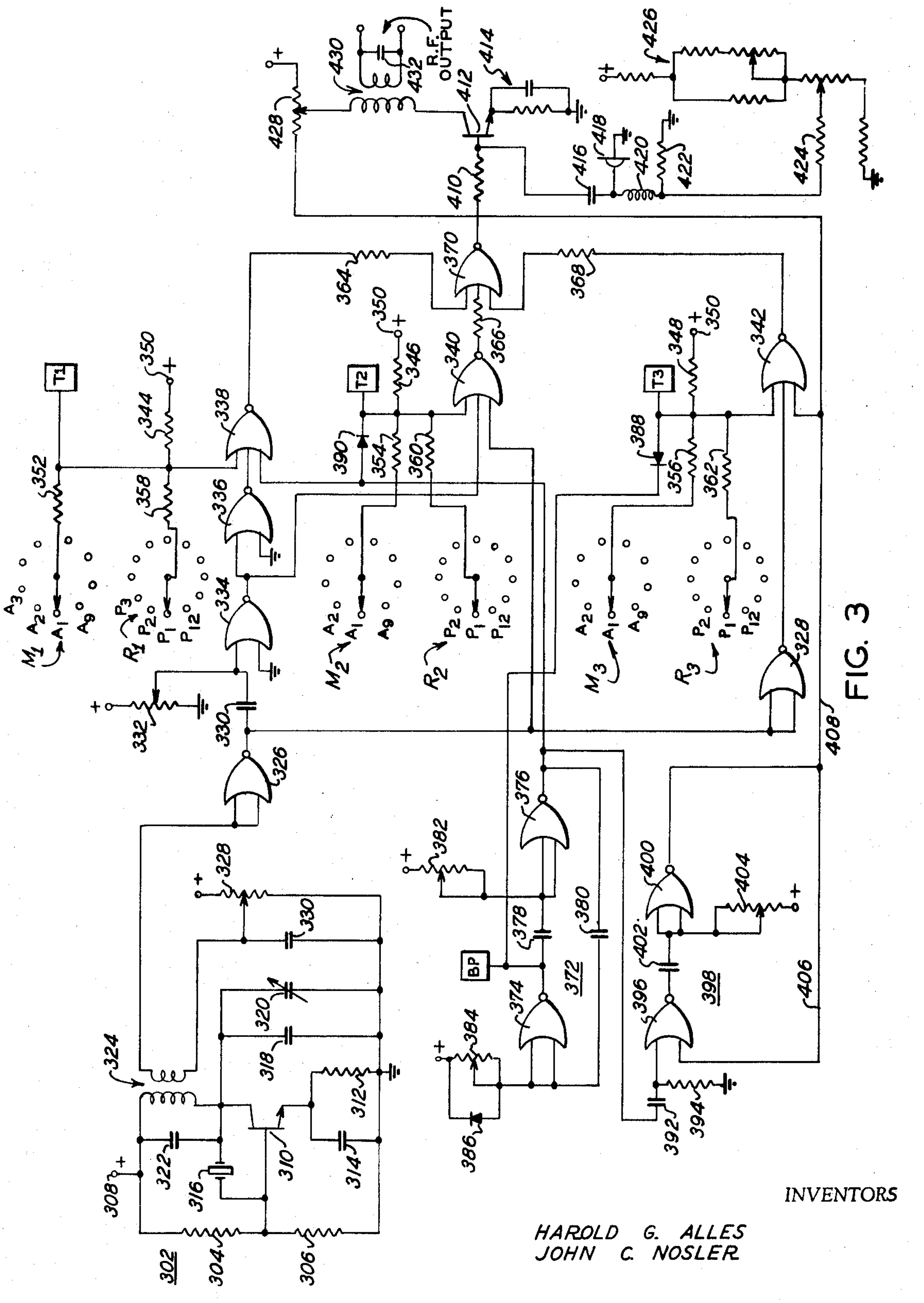
FIG. 3 is a schematic diagram of the color and sync circuit of the interface network of FIG. 1.

The color and sync circuit 300 of the present invention is illustrated in schematic form in FIG. 3 and includes a color subcarrier oscillator 302 having a pair of serially connected resistors 304 and 306 connected from a source of positive operating potential, represented by terminal 308, to ground, with the junction of the resistors coupled to the base electrode of an oscillator transistor 310. The oscillator transistor 310 has its emitter electrode returned to ground via a resistor 312 and a parallel connected capacitor 314. Its collector electrode is coupled back to the base electrode by a standard crystal 316 of the type utilized in conventional color television systems. The collector electrode of transistor 310 is also returned to ground by a fixed capacitor 318 and a parallel coupled tunable capacitor 320 with the collector further tied to power source 308 via a capacitor 322 and the primary winding of a transformer 324. Capacitor 322 and the primary winding of the transformer are connected to form a parallel circuit resonant at 3.58 MHZ. It is noted that crystal 316 is a third overtone crystal which is designed with seven digit accuracy to assure synchronization with the reference oscillator within a standard television receiver. The crystal is operated between its series and parallel modes, so that its frequency can be adjusted slightly by tuning capacitor 320.

The secondary winding of transformer 324 is connected to both inputs of a NOR logic gate 326. It is noted that one of the inputs of logic gate 326 may be grounded rather than connected to transformer 324 without altering system operation, depending upon the desired construction of the circuit of the present invention. The bias of gate 326 is adjusted by a potentiometer 328, with a capacitor 330 providing an AC path to ground.

Before proceeding with the description of the color and sync network 300, it is pointed out that the illustrated embodiment of the present invention utilizes digital integrated circuit logic elements to make its design simple and its manufacture economical. The integrated circuit elements used are two and three input NOR logic gates. The preferred construction of each of the NOR gates results in each input of any one gate being equivalent to a 15K ohm resistor in series with two diodes. Thus, the input impedance is always greater than 15K ohms. The output of each gate has an impedance of less than 1,000 ohms and normally assumes either one of two states; i.e., a "high" state at or near the value of the supply voltage (nominally 5 volts), and a "low" state at or near ground potential. In operation and under exemplary experimental conditions, if all the inputs of a gate are held at less than 1.5 volts, the output will be high. If one or more of the inputs is above 1.9 volts, the output will be low. If all inputs but one are less than 1.5 volts, and one input is between 1.5 and 1.9 volts, the output may be anywhere between the low and high states. Two typical logic gate packages which have been found to be particularly well suited for use in the present circuit are manufactured by the Signetic Corp. as integrated circuits No. SU370 and No. SU380.

The output of gate 326 is fed to both inputs of a second NOR gate 328 and is coupled by a capacitor 330 to a potentiometer 332 as well as to one input of a third NOR gate 334 which has its second input grounded. Capacitor 330 and potentiometer 332 act to differentiate the output of gate 326 thus enabling gate 334 to produce a phase shift, as will be further clarified below. The output from gate 334 is fed to one input of another NOR gate 336 which also has its other input grounded. The output terminal of gate 336 is, in turn, connected to one input of a three-input NOR gate 338. The output terminals of gates 326 and 334 are each coupled to one of the three input terminals of another three-input NOR gate 340, with the output of gate 328 similarly connected with an input terminal of a third three-input NOR gate 342.

Connected to an input of each of the three-input NOR gates 338, 340 and 342 is a respective one of three similar networks, each including a first resistor 344-346-348 connected between the input terminal of the gate and the operating potential appearing on common bus line 110 of audio separator network 100 via terminals 350, a second resistor 352-354-356 connected between the input terminal and the rotor or common arm of a rotary switch $M_1$-$M_2$-$M_3$ which has its fixed contacts connected with the output terminals $A_1$ through $A_9$ from audio separator network 100, and a third resistor 358-360-362 connected between the input terminal and the rotor or common arm of a rotary switch $R_1$-$R_2$-$R_3$ which has its fixed contacts connected with output terminals $P_1$ through $P_{12}$ from the pattern generator network 500, as will be more fully described below. The above described input terminals of each gate also serve as test points (i.e., points at which preselected signals may be applied to produce a particular test pattern for the purpose of aligning the circuit of the present invention and the color television receiver), the three test points being labelled T1, T2 and T3 in FIG. 3.

The outputs of gates 338, 340 and 342 are fed via resistors 364, 366 and 368, respectively, to the three inputs of a summing gate 370. Resistors 364, 366 and 368 slow down the response of gate 370 so as to reduce the generation of unwanted harmonic components in the output thereof.

The color and sync circuit 300 also includes a blanking pulse generator which may be of any suitable type such as a free-running multivibrator, indicated generally at 372, which includes a pair of two-input NOR gates 374 and 376 which each have their inputs tied together, as illustrated. The two gates 374 and 376 have their inputs and outputs cross-coupled through first and second capacitors 378 and 380 with a pair of variable resistors or potentiometers 382 and 384 respectively connected from the junction of capacitor 378 and gate 376 and the junction of capacitor 380 and gate 374 to a source of positive voltage. A diode 386 is connected across resistor 384 to assist the discharging of capacitor 380. It is noted that the values of capacitors 378 and 380 and the values of potentiometers 382 and 384 are unequal causing multivibrator 372 to generate a pair of asymmetric signals the duty-cycles of which may be readily adjusted in accordance with the wiper arm positions of potentiometers 382 and 384; these asymmetric signals set the system horizontally frequency and the blanking pulse width. The output of gate 374 is fed to a terminal labelled BP which is adapted to be coupled to the pattern generator network 500, as will be described below. Gate 374 is also connected at its output to the cathode of a diode 388 which has its anode connected with the upper input of gate 342. The opposite output signal from the multivibrator 372 is taken from the output of gate 376 and coupled directly to the lower input of gate 338 as well as to the anode electrode of a diode 390. The cathode electrode of diode 390 is coupled to the upper input of NOR gate 340 in a manner similar to the connection of diode 388 and NOR gate 342. The output from gate 376 of the blanking pulse multivibrator is also fed through a capacitor 392 to a resistor 394, which is returned to ground, and to one input of NOR gate 396 of a horizontal sync pulse generator 398.

Horizontal sync pulse generator 398 is a monostable multivibrator triggered by a rising voltage signal from the output of gate 376. Monostable multivibrator 398 also includes a second NOR gate 400 which has its two input terminals connected together and coupled via a capacitor 402 to the output of gate 396 and via a variable resistor 404 to a source of positive operating potential. The output of gate 400 is fed back via line 406 to the lower input of gate 396 and is also coupled to the lower input of NOR gate 342 by line 408.

The output of gate 370 is coupled by a resistor 410 to the base electrode of a modulation transistor 412 which has its emitter connected to ground through a parallel connected resistor-capacitor network 414. The base of transistor 412 is also connected via a coupling capacitor 416 to an R.F. oscillator including a tunnel diode 418 connected between capacitor 416 and ground. An inductor 420 and a resistor 422 are connected in series across the tunnel diode 418, with the junction between the resistor and the inductor coupled through another resistor 424 to a resistive voltage divider network, indicated generally at 426. Resistive network 426 is coupled from a source of operating potential and ground as illustrated.

The output from gate 400 of horizontal sync pulse generator 398 is coupled via line 408 to one terminal of a potentiometer 428 which is connected at its other end to the positive voltage source. The wiper arm of potentiometer 428 is connected to the upper end of the primary winding of an output transformer 430, and the other end of the primary of transformer 430 is connected with the collector of transistor 412. The R.F. output of the system is developed across the secondary winding of transformer 430 which has a capacitor 432 connected in parallel thereacross.

Figure 4:
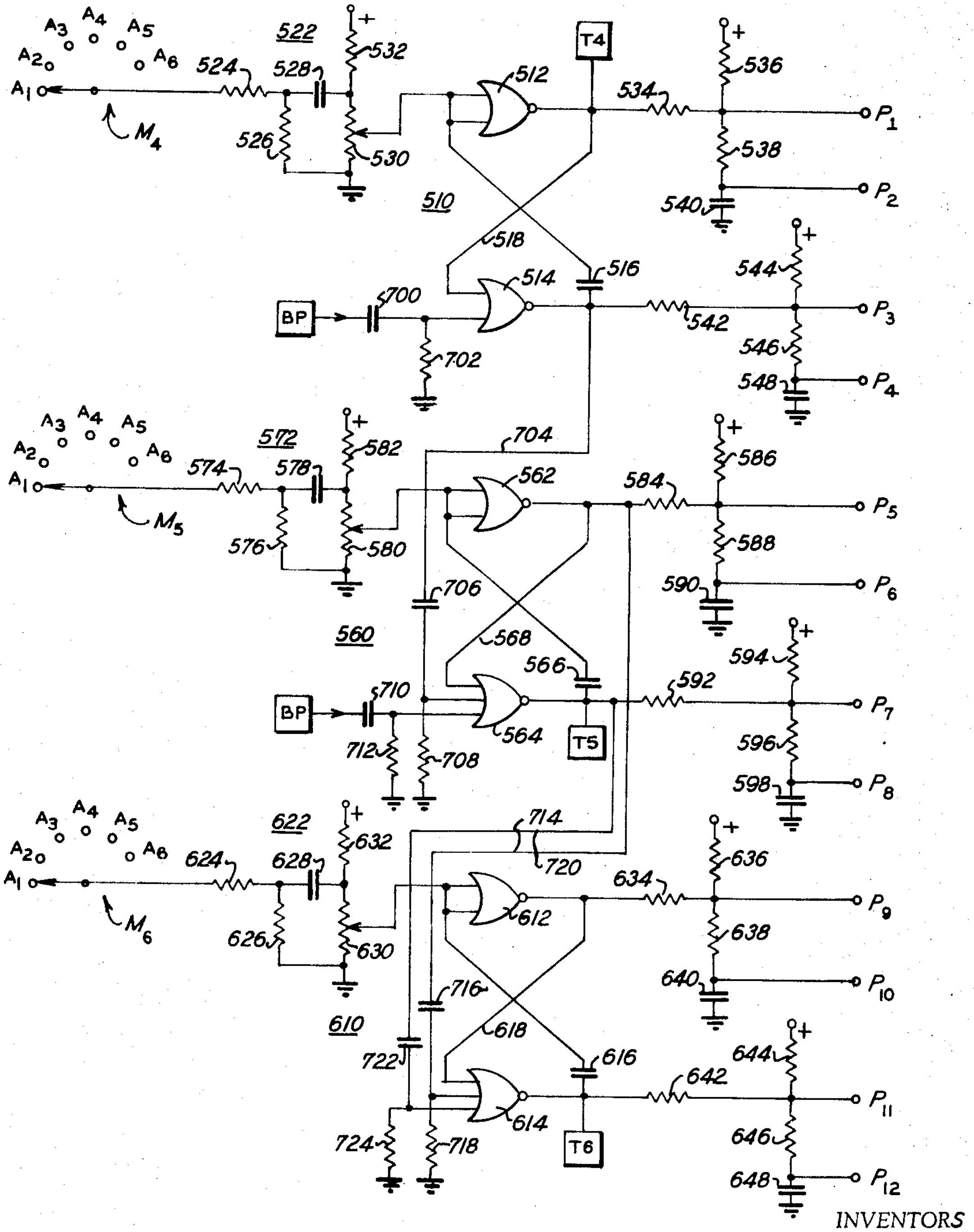
FIG. 4 is a schematic diagram of the pattern generator circuit of the interface network of FIG. 1.

Referring now to FIG. 4, the pattern generating network 500 includes three variable-duration monostable multivibrators 510, 560 and 610 each including a first NOR gate 512-562-612 and a second NOR gate 514-564-614. The output of gate 514-564-614 is cross-coupled to both of the inputs of gate 512-562-612 by a capacitor 516-566-616 while the output of gate 512-562-612 is cross-coupled directly to the upper input terminal of gate 514-564-614. The duration of the output of each of the monostable multivibrators 510, 560 and 610 is responsive to the processed audio signals from the audio separator network 100 appearing at terminals $A_1$ through $A_9$. These signals are coupled to the fixed contacts of rotary switches $M_4$, $M_5$ and $M_6$, with only six of the processed audio signals being illustrated solely for the sake of clarity.

The common or movable arm of each of the switches $M_4$, $M_5$ and $M_6$ is connected to a respective one of timing networks 522, 572 and 622 for multivibrators 510, 560 and 610, respectively. Each of the timing networks 522, 572 and 622 includes a first resistor 524-574-624 which is connected in series with a second resistor 526-576-626 between the common arm of switch $M_4$-$M_5$-$M_6$ and ground. A capacitor 528-578-628 is connected between the junction of the first and second resistors and the junction of a potentiometer 530-580-630 and a third resistor 532-582-632. The potentiometer and third resistor are connected in series across a source of operating potential, as shown, with the wiper arm of potentiometer 530-580-630 coupled with both inputs of gate 512-562-612.

The output of gate 512-562-612 is coupled to a normalizing network formed by resistors 534-584-634 and 536-586-636 which are connected in series between the gate output terminal and the positive supply. The junction of the resistors is connected to an output terminal $P_1$-$P_5$-$P_9$ as well as to an integrating circuit including a resistor 538-588-638 and a series connected capacitor 540-590-640 which is returned to ground. The output of the integrating circuit is taken from the junction of the integrating resistor-capacitor circuit and fed to another output terminal $P_2$-$P_6$-$P_{10}$.

The output of gate 514-564-614 is similarly coupled to a normalizing network including resistors 542-592-642 and 544-594-644 and having an output terminal $P_3$-$P_7$-$P_{11}$. In addition, the output of the normalizing network for gate 514-564-614 is fed to a similar integrating circuit including a resistor 546-596-646 and a capacitor 548-598-648 with its output connected to a terminal $P_4$-$P_8$-$P_{12}$.

One of the outputs of each of the multivibrators 510, 560 and 610 is fed to a respective one of test points $T_4$, $T_5$ and $T_6$ which may be optionally provided for interconnection with test points $T_1$, $T_2$ and $T_3$, respectively, of the color and sync circuit 300 to enable adjustment of the standard television receiver, as will be described below.

Multivibrator 510 is triggered by a rising voltage from the output of gate 374 (FIG. 3) of blanking pulse generator 372 via terminal point BP. The signal at point BP is fed through a differentiating circuit including series connected capacitor 700 and resistor 702 to the lower input of gate 514. Multivibrator 510 is thus triggered once during each horizontal period. Multivibrator 560 is triggered in a similar manner from the output of gate 514 of multivibrator 510 via line 704 and a differentiating network including capacitor 706 and resistor 708. The junction of capacitor 706 and resistor 708 is connected with the middle terminal of gate 564 of multivibrator 560 with the lower input of gate 564 adapted to receive additional triggering pulses from point BP through another differentiating network formed by a capacitor 710 and a series connected resistor 712. Multivibrator 560 is thus adapted to be triggered twice during each horizontal period.

The third multivibrator 610 of pattern generator 500 is triggered four times during each horizontal period, twice by the rising voltage from gate 562 via line 714 and a differentiator formed by capacitor 716 and resistor 718, and twice by the rising voltage from gate 564 via line 720 and a differentiator formed by capacitor 722 and resistor 724. The triggering signals from differentiator networks 716-718 and 722-724 are coupled to the middle and lower inputs of gate 614 of multivibrator 610, in a manner similar to that of gate 564.

In discussing the operation of the circuit of the present invention, reference will be made to the amplitude vs. time plots of FIGS. 5 and 6 which are ideal representations of the signals appearing at various points in the system under exemplary conditions chosen for the sake of clarity. It should be pointed out that the signals represented by the curves of FIG. 5 have a nominal frequency of 3.58 MHZ while those of FIG. 6 have a much lower frequency centered about 15 KHZ. Thus, the signals in FIGS. 5 and 6 are quite different and appear to be similar only because the time scale for FIG. 5 has been expanded somewhat in order to clarify the characteristics of the curves illustrated therein.

Figure 5:
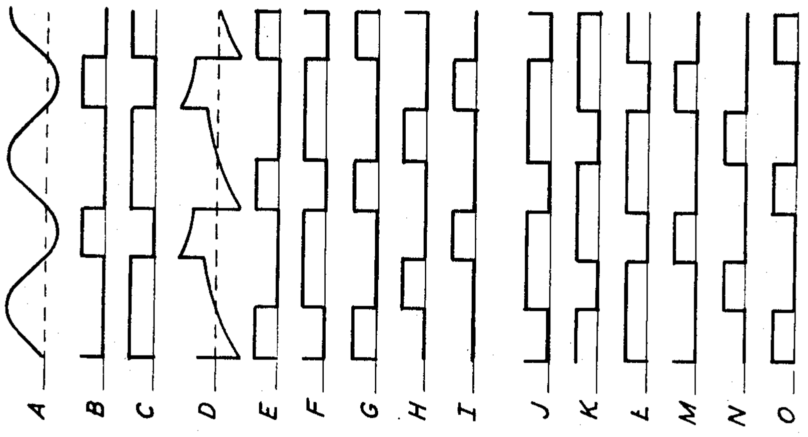
FIGS. 5 and 6 are various amplitude vs. time plots taken at different points in the network of FIG. 1 and illustrative of the operation of the circuit of the present invention.
Figure 6:
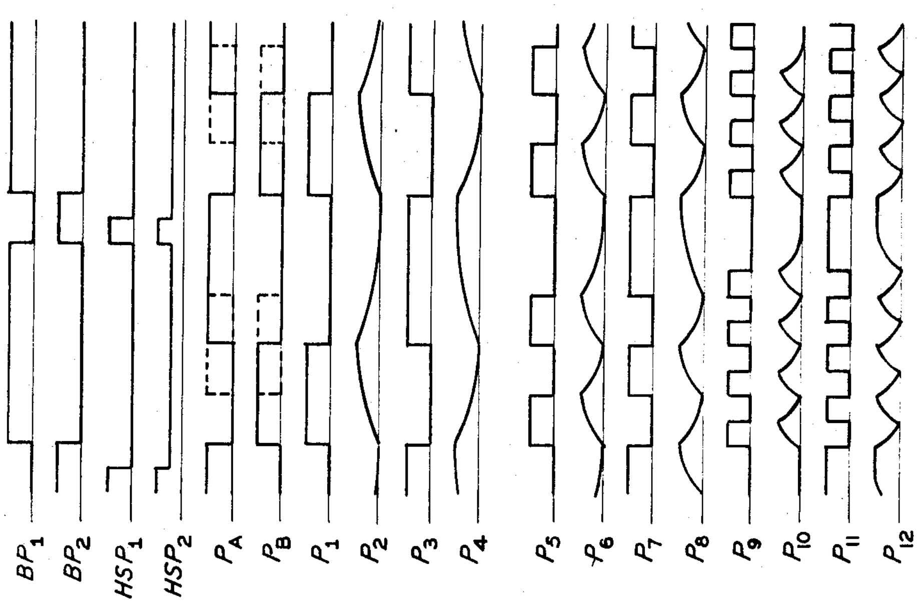

Referring first to the color and sync circuit 300 of FIG. 3, the oscillator 302 generates a sinusoidal signal, illustrated in plot A of FIG. 5, at the standard 3.58 MHZ color subcarrier frequency. The bias level of curve A is set by adjusting potentiometer 328 so that NOR logic gate 326 will have a duty cycle causing the generation of an asymmetric output signal as shown in plot B. NOR gate 328 serves as a complementer for gate 326 and its output is represented by the curve of plot C. The output of gate 326 (curve B) is also fed to a differentiator formed by capacitor 330 and resistor 332 which applies a signal as shown in curve D to the input of NOR gate 334. Gate 334 then produces an output square wave as illustrated in plot E which is complemented or inverted by NOR gate 336, its output signal being represented by plot F. It is noted that the switching "level" for each of the gates 326 and 334 is illustrated by the dashed lines superimposed on curves A and D, respectively, whereupon the signals represented in curves B and E will be produced at their respective outputs. In other words, when the input signals to the gates are either above or below the switching level, the output signals will be either low or high, respectively. It should also be recalled that input signals between 1.5 and 1.9 volts may produce either a high or low output depending upon variations from device to device; however, the dynamic range at the switching level, i.e., the actual change in input signal level required to transpose each gate from one state to another is less than 0.1 volt. Thus, while the transition may occur anywhere in the range between 1.5 and 1.9 volts, such transition is very rapid and results in the generation of nearly square wave output signals by the gates, as shown.

If the upper and lower inputs to gate 338 are held at a level less than 1.5 volts, the output of this gate is equivalent to an inverted version of the signal from gate 336 (curve F), as shown in plot G. Likewise, if the upper input of gate 340 is held below 1.5 volts, its output signal will be high only when the signals fed to its lower input from gate 326 (curve B) and to its middle input from gate 334 (curve E) are both low; its output signal is thus shown by curve H. In a similar manner, if the upper and lower inputs to gate 342 are held low, its output will be equivalent to an inverted version of the output of gate 328 (curve C) as represented by plot I. It can thus be seen that the NOR gates 326, 328, 334, 338, 340 and 342 cooperate to produce three mutually exclusive, phase-shifted asymmetric square wave signals at the 3.58 MHZ color subcarrier frequency as illustrated in curves G, H and I of FIG. 5.

The three signals from gates 338, 340 and 342 are summed by NOR gate 370 with its output applied to the base of modulating transistor 412. By varying the signals applied to the other inputs of gates 338, 340 and 342 eight possible output signals may be generated at the output of gate 370. Six of these signals are graphically shown by plots J through O in FIG. 5 with the other two outputs being a constant low or zero voltage signal producing an entirely white picture on the screen of the television receiver and a constant high signal producing a black picture. It is noted that each of the six signals represented in plots J through O of FIG. 5 causes the generation of a different color by the television receiver; e.g., curve J may produce a red picture, curve K a blue picture, curve L a green picture, curve M a composite red and blue picture, etc. Of course the particular colors displayed will also depend upon the color brightness and tint control settings of the particular television receiver being used as well as a number of other adjustments.

It should also be understood that by generating asymmetric phase-shifted square wave signals by utilizing digital NOR logic gates, two balanced modulators, which would otherwise be required, are eliminated. As a result, the present circuit is highly simplified and is much more economical to manufacture. In addition, by generating the phase-exclusive asymmetric signals rather than sine waves or the like, more than one color at a time may be produced without having to resort to direct amplitude modulation of the carrier. By actuating gates 338, 340 and 342 at various times, the single combined signal from summing gate 370 will cause the generation of any one or any combination of colors without necessitating the use of any additional complex circuitry as has been the customary practice in the past.

The output signal from gate 370 is affected not only by gates 326, 328, 334 and 336 but also by the signals from blanking pulse generator 372 and the horizontal sync pulse generator 398. The output signals from blanking pulse generator 372 are shown in FIG. 6 wherein curve $BP_1$ represents the output from gate 374 and curve $BP_2$ represents the output from gate 376. It is noted that the output of the blanking pulse generator is, of necessity, quite asymmetric to meet the established FCC standards. In this respect, it is pointed out that since capacitor 380 has such a short time to discharge during that part of the cycle, diode 386 is connected across potentiometer 384 to aid the discharging and assure proper asymmetric system timing. The horizontal sync pulse generator 398 is triggered by a rising voltage from gate 376 and its output, which is fed to line 408, is illustrated in curve $HSP_1$ of FIG. 6.

Since the output of gate 374 of blanking pulse generator 372 is coupled via diode 388 to the upper input of gate 342, and since the output of gate 376 is similarly coupled via oppositely polarized diode 390 to the upper input of gate 340 as well as directly to the lower input of gate 338, whenever the output of gate 376 (curve $BP_2$) is high, gates 338 and 340 produce a low output signal and gate 342 is placed in its high state. Diode 390 isolates the input to gate 340 from the output of gate 376 whenever its output is low. Consequently, during the blanking pulse interval, gates 338 and 340 are held low and gate 342 is maintained high, regardless of any other signals applied thereto. The blanking pulse is thus passed via gate 342 and gate 370 to the modulation transistor 412 wherein it is impressed upon the carrier produced by tunnel diode relaxation oscillator 418.

The horizontal sync pulse is also applied to the carrier in the following manner. The output of the horizontal sync pulse generator 398 is fed via line 408 to potentiometer 428 wherein it is used as part of the supply current for the collector of transistor 412. The waveform at the wiper arm of potentiometer 428 is shown as plot $HSP_2$ of FIG. 6. During the period of high output from gate 400, the collector of transistor 412 has a relatively large current supply, so that the carrier is amplified with a relatively large gain. When the output of gate 400 is reduced, the current supply of the transistor diminishes and the carrier is amplified to a lesser degree. In this way, the horizontal sync pulse is impressed or modulated upon the carrier.

A third necessary component of the R.F. output signal, namely the color burst signal, is generated by utilizing gate 342, which also functions as a color gate. As mentioned above, the outputs of gates 338 and 340 are held low during the blanking interval. During this time period, the output of horizontal sync pulse generator 392 is applied via line 408 to the lower input of gate 342. Since the lower input of gate 342 is high during the horizontal sync pulse, no output will be generated until the end of the horizontal sync pulse. Thus, during the period after the end of the horizontal sync pulse and before the end of the blanking pulse, gate 342 passes a 3.58 MHZ signal from oscillator 302 to summing gate 370. The other two inputs of gate 370 are low at this time so the 3.58 MHZ signal passes to the output stage. The bias for the base of transistor 412 is supplied by gate 370 via resistor 410. Thus, with the output of gate 370 high, transistor 412 is biased for maximum gain and the output of tunnel diode relaxation oscillator 418 is amplified to the maximum extent. With the output of gate 370 low, no DC bias flows and the R.F. carrier is only slightly amplified. Approximately 80 percent modulation is accomplished in this manner to properly impress the color burst signal upon the carrier. It is also noted that even though the output of gate 370 is nearly a square wave, stray capacitance and the high resistance of resistor 410 tend to make the resultant modulated signal rounded and nearly sinusoidal.

Thus, it can be seen that the color and sync network 300 effectively generates an R.F. signal at the output of transformer 430 which contains not only 3.58 MHZ color subcarrier signals but horizontal blanking pulses, horizontal sync pulses and color burst pulses as well. It should be understood that since the pictorial patterns generated by the circuit of the present invention are generally of a random nature, no vertical blanking or sync pulses are required.

The audio input signals applied to the audio separator 100 (FIG. 2) are filtered, rectified and smoothed and appear on terminals $A_1$ through $A_9$. These signals are fed to switches $M_1$, $M_2$ and $M_3$ of the color and sync circuit 300 (FIG. 3) so as to further modulate the R.F. signal generated thereby in accordance with the various frequency components contained therein, as will be more fully described below. The audio signals at terminals $A_1$ through $A_9$ are also applied to switches $M_4$, $M_5$ and $M_6$ of the pattern generator network 500 as shown in FIG. 4.

The monostable multivibrators 510, 560 and 610 of pattern generator 500 are triggered once, twice and four times, respectively, during each horizontal period as initiated by the blanking pulse signal from point BP, as described above. The outputs of the multivibrators at terminals $P_1$ through $P_{12}$ are thus frequency related and are illustrated in respective curves $P_1$ through $P_{12}$ of FIG. 6. The duration of the period spent in the unstable state of each of the multivibrators is variable as shown by the dashed lines superimposed in curves $P_A$ and $P_B$ which represent the two normalized outputs from multivibrator 510. The interval of the unstable state of each multivibrator is dependent upon two factors: the time constant of the RC network of capacitor 516-566-616 and resistors 530-580-630 and 532-582-632, and by the bias level on the input of gate 512-562-612 produced by input network 522-572-622. Adjustment of potentiometer 530-580-630 establishes the nominal duration. The input networks thus make it possible to vary the nominal duration by as much as ±50 percent in direct relationship with the audio signals applied to switches $M_4$, $M_5$ and $M_6$. Thus, the waveshape of the various nominal signals produced by the pattern generator 500 and illustrated in curves $P_1$ through $P_{12}$ of FIG. 6 are each uniquely varied in response to the audio input. These signals are applied to switches $R_1$, $R_2$ and $R_3$ of color and sync circuit 300 (FIG. 3) so as to enhance the variety of the resultant visual patterns on the television screen in the manner to be described below.

The audio inputs on switches $M_1$, $M_2$ and $M_3$ as well as the audio-responsive internally generated pattern signals on switches $R_1$, $R_2$ and $R_3$ cooperate to modulate the R.F. carrier in the following manner. Standard television format specifies that a maximum transmitted carrier is to generate a black picture, while transmission of a minimum carrier is to generate a white picture. Gates 338, 340 and 342 are therefore biased via resistors 344, 346 and 348, respectively, so that their outputs are normally low. Thus, the output of gate 370 is normally high and maximum carrier is applied to the output. Consequently, with no input signal a black screen is produced.

The upper inputs of gates 338, 340 and 342 are used as summing junctions with the signals from switches $M_1$, $M_2$ and $M_3$ as well as those from $R_1$, $R_2$ and $R_3$ coacting to selectively overcome the bias supplied by common bus line 110 via terminals 350. The internally generated signals applied via switches $R_1$, $R_2$ and $R_3$ are always more positive than the bias voltage applied to terminals 350 so that the internal pattern signals tend to make it more difficult to open the gates. Signals applied from the audio separator 100 via switches $M_1$, $M_2$ and $M_3$ are preferably rectified so that they are always more negative than the bias voltage at terminals 350. By coupling terminals 350 with the common bus line 110 of audio separator 100, the audio signals at switches $M_1$, $M_2$ and $M_3$ are automatically less than the potential at terminals 350 to assure proper operation regardless of the particular audio input signal content. Thus, the internally generated signals and the audio input signals add at their respective summing inputs, and only if the resultant combined signal is slightly less than the bias voltage at point 350 will the gate open to pass its associated 3.58 MHZ color subcarrier signal. The combined signal at gate 370 is therefore uniquely representative of the audio input signals and contains numerous color pattern signals for display.

It is noted that by rotating switches $M_1$ through $M_6$ and $R_1$ through $R_3$, a great variety of interesting and entertaining patterns may be caused to be generated by the television receiver, all of which being intimately correlated with the tonal content of the applied audio signals. Of course any number of different techniques may be employed to interconnect the audio input processor 100, the pattern generator 500 and the color and sync circuit 300, such as patch cords, pushbutton switches, motor-driven rotary switches, and the like. Furthermore, all of the variable controls need only be set initially, with the exception of the rotary switches and the level control 108 (FIG. 2) which are preferably conveniently accessible to the viewer.

To assure proper alignment of the various controls of the television receiver being employed, an internally generated test pattern may be established by opening switch 104 to remove the audio input and by connecting test points $T_1$, $T_2$ and $T_3$ with points $T_4$, $T_5$ and $T_6$, respectively. A four-pole, double-throw switch, mounted on a control panel may also be provided, if desired. The resultant test pattern has eight vertical bars, each of which having a different color. By using the pattern, relative bar width, color signals, and general picture quality may be adjusted. Proper adjustment of the television will result in the most dramatic display, and accordingly, the most unusual and artistic portrayals.

Thus, there is provided a relatively simple, convenient and effective electrical circuit for readily enabling the visual display of an audio signal by a conventional television receiver. By generating additional audio-responsive internal signals to complement frequency correlated audio input signals, a tremendous variety of displays are generated with a minimum of component parts while the dynamic response of the system is greatly enhanced thereby permitting the use of digital integrated circuitry.

The circuit of the present invention may also be used to produce any number of preselected pictorial displays on an unaltered television receiver by applying correlated prerecorded audio tone signals. A dual channel tape recorder, for example, may have desired musical selections recorded on one channel, with the other channel independently controlling the pictorial displays generated on the screen of the television receiver.

The present invention is therefore capable of efficiently transforming an unaltered standard television receiver into an audio signal interpretor for entertainingly producing multifariously colored kaleidoscopic portrayals of preselected audio tone combinations, random audio signals, or desired musical selections on the screen of the receiver.

Inasmuch as the present invention is subject to many variations, modifications and changes in detail, it is intended that all matter contained in the foregoing description or shown in the accompanying drawings shall be interpreted as illustrative and not in a limiting sense.

What is claimed is:

1. An audio-video interface network for transforming audio signals from an audio source into a form suitable for reception and visual display by an unaltered standard television receiver, comprising in combination audio separating means adapted to be connected with the audio source for separating the audio signals into a plurality of audio signals lying within a plurality of audio frequency bands;

pattern generating means connected with said audio separating means for generating a plurality of electrical signals, said pattern generating means being responsive to said plurality of separated audio signals to vary the waveform of each of said plurality of electrical signals in accordance with the content of said plurality of separated audio signals; and video signal generating means connected with said audio separating means and said pattern generating means and adapted to be coupled with the television receiver for generating a modulated radio frequency television signal, said video signal generating means being responsive to said plurality of electrical signals from said pattern generating means and said plurality of separated audio signals to vary the video modulation carried by said generated radio frequency television signal in accordance with audio information carried by said plurality of separated audio signals and the waveform of said plurality of electrical signals whereby the television receiver displays a continually changing visually perceptible interpretation of the applied audio signals.

2. The invention as recited in claim 1 wherein said audio separating means comprises first and second filter means each adapted to be connected with the audio source.

3. The invention as recited in claim 2 wherein said first filter means comprises high pass filter means adapted to receive the audio signals from the audio source for providing high frequency audio signals at a first output terminal, first rectifying means connected with said high pass filter means for providing rectified high frequency audio signals at a second output terminal, and first filter means connected with said first rectifying means for providing rectified and filtered high frequency audio signals at a third output terminal.

4. The invention as recited in claim 3 wherein said second filter means comprises low pass filter means adapted to receive the audio signals from the audio source for providing low frequency audio signals at a fourth output terminal, second rectifying means connected with said low pass filter means for providing rectified low frequency audio signals at a fifth output terminal, and second filter means connected with said second rectifying means for providing filtered low frequency audio signals at a sixth output terminal.

5. The invention as recited in claim 1 wherein said pattern generating means comprises monostable means responsive to said plurality of separated audio signals for generating a plurality of unique aperiodic output signals representative of the information carried by said separated audio signals.

6. The invention as recited in claim 5 wherein said pattern generating means further comprises signal processing means connected with said monostable means for integrating said plurality of aperiodic output signals.

7. The invention as recited in claim 6 wherein said monostable means comprises a plurality of variable-duration monostable multivibrators connected in cascade arrangement.

8. The invention as recited in claim 7 wherein said pattern generating means further comprises a plurality of switch means selectively connecting at least one of said plurality of separated audio signals with each of said monostable multivibrator means.

9. The invention as recited in claim 1 wherein said video signal generating means generates a modulated radio frequency color television signal and includes a color subcarrier oscillator, first circuit means connected with said oscillator for generating a plurality of mutually exclusive square wave signals at the frequency of said subcarrier oscillator, and second circuit means connected with said first circuit means for combining said generated plurality of square wave signals to form a composite video color modulating signal.

10. The invention as recited in claim 9 wherein said video signal generating means further includes third circuit means connected with said audio separating means, said pattern generating means and said first and second circuit means for applying each of said plurality of square wave signals to said second circuit means in response to said separated audio signals and said electrical signals.

11. A device for converting audio signals into a form suitable for display by a television receiver, comprising in combination input means adapted to be connected with a source of audio signals;

pattern generating means connected with said input means and responsive to said audio signals for generating an electrical signal representative of said audio signals and having a duty cycle greater than the television receiver blanking interval;

said pattern generating means generating a rectangular wave having a duty cycle responsive to the amplitude of said audio signals; and coupling means adapted to be connected with a television receiver for coupling said electrical signal to the television receiver whereby a visually perceptible interpretation of said audio signals may be displayed.

12. In a color television signal generating network having a video color-subcarrier oscillator, the combination comprising first circuit means adapted to be connected with the subcarrier oscillator for generating a plurality of mutually exclusive phase-shifted square wave signals at the frequency of the subcarrier oscillator;

second circuit means connected with said first circuit means for combining said generated plurality of square wave signals to form a composite video color modulating signal; and third circuit means connected with said first and second circuit means and adapted to be connected with a source of electrical signals, said third circuit means responsive to said electrical signals for directly applying each of said plurality of square wave signals to said second circuit means in accordance with said electrical signals whereby said video color modulating signal is representative of a plurality of different colors.

13. The invention as recited in claim 12 wherein said first circuit means comprises a plurality of NOR logic gates.

14. The invention as recited in claim 13 wherein an output terminal of a first one of said plurality of NOR logic gates is connected with an input terminal of a second one of said plurality of NOR logic gates by an RC phase shifting network.

15. The invention as recited in claim 13 wherein said plurality of NOR logic gates comprises seven NOR logic gates.

16. The invention as recited in claim 12 wherein said plurality of square-wave signals comprises three square wave signals, and wherein said second circuit means comprises a three-input NOR logic gate.

17. In a system for producing continuously varying video interpretations of signals from an audio source, the combination comprising pattern generating means for generating a plurality of different electrical signals and having input terminal means adapted to be connected with the audio source;

said pattern generating means being responsive to the audio signals at said input terminal means to vary the waveform of each of said generated plurality of electrical signals in accordance with the tonal content of such audio signals; and signal processing means connected with said pattern generating means for integrating said plurality of electrical signals whereby each of said plurality of electrical signals is uniquely representative of sound information carried by the audio signals.

18. The invention as recited in claim 17 wherein said pattern generating means comprises monostable means responsive to the audio signals for generating a plurality of aperiodic output signals representative of the sound information carried by the audio signals.

19. The invention as recited in claim 18 wherein said monostable means comprises first, second and third variable-duration monostable multivibrators each generating a different one of said aperiodic output signals.

20. The invention as recited in claim 19 wherein said first, second and third variable-duration monostable multivibrators are connected in cascade arrangement.

21. A device for converting audio signals into a form suitable for display by a television receiver, comprising in combination input means adapted to be connected with a source of audio signals;

pattern generating means for generating a plurality of electrical signals having a duty cycle greater than the television receiver blanking interval; and circuit means connected with said input means and said pattern generating means for combining said audio signals and said electrical signals to provide an output signal, said circuit means being adapted to be connected with the television receiver for coupling said output signal to the television receiver whereby a visually perceptible interpretation of said audio signals may be displayed.

22. The invention as recited in claim 21 wherein said input means comprises audio means separating said audio signals into a plurality of frequency bands.

23. The invention as recited in claim 22 wherein said audio means includes a plurality of filter means.

24. The invention as recited in claim 23 wherein said audio means further includes a plurality of rectifying means connected with said plurality of filter means.

25. The invention as recited in claim 21 wherein said pattern generating means generates an electrical signal having a frequency which is a rational multiple of the horizontal sweep frequency of the television receiver.

26. The invention as recited in claim 25 wherein said pattern generating means generates a rectangular wave.

27. The invention as recited in claim 25 wherein said pattern generating means generates a triangular wave.

28. The invention as recited in claim 21 wherein said pattern generating means is connected with said input means and is responsive to said audio signals.

29. The invention as recited in claim 28 wherein said pattern generating means generates a rectangular wave having a duty cycle responsive to the amplitude of said audio signals.

30. The invention as recited in claim 21 wherein said circuit means includes video signal generating means connected with said input means and said pattern generating means for generating a modulated radio frequency television signal whereby said output signal is in modulated radio frequency form.

31. The invention as recited in claim 30 wherein said video signal generating means generates a radio frequency signal modulated with synchronization pulses and amplitude modulated by said output signal.

32. The invention as recited in claim 30 wherein said video signal generating means generates a modulated radio frequency color television signal and includes a color subcarrier oscillator.

33. A device for converting audio signals into a form suitable for display by a television receiver, comprising in combination input means adapted to be connected with a source of audio signals;

pattern generating means connected with said input means and responsive to said audio signals for generating an electrical signal representative of said audio signals and having a duty cycle greater than the television receiver blanking interval;

said pattern generating means generating an electrical signal having a frequency which is a rational multiple of the horizontal sweep frequency of the television receiver; and coupling means adapted to be connected with the television receiver for coupling said electrical signal to the television receiver whereby a visually perceptible interpretation of said audio signals may be displayed.

34. The invention as recited in claim 33 wherein said pattern generating means generates a rectangular wave.

35. The invention as recited in claim 33 wherein said pattern generating means generates a triangular wave.

* * * * *